(12) United States Patent
Qu et al.

(10) Patent No.: US 10,979,171 B2
(45) Date of Patent: Apr. 13, 2021

(54) DATA TRANSMISSION METHOD, NETWORK DEVICE, AND TERMINAL DEVICE

(71) Applicant: HUAWEI TECHNOLOGIES CO., LTD., Shenzhen (CN)

(72) Inventors: Bingyu Qu, Beijing (CN); Ruiqi Zhang, Beijing (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 0 days.

(21) Appl. No.: 16/716,409

(22) Filed: Dec. 16, 2019

(65) Prior Publication Data

US 2020/0119837 A1    Apr. 16, 2020

Related U.S. Application Data

(63) Continuation of application No. PCT/CN2018/091595, filed on Jun. 15, 2018.

(30) Foreign Application Priority Data

Jun. 16, 2017 (CN) .......................... 201710459786.7

(51) Int. Cl.
*H04L 1/00* (2006.01)
*H04L 1/06* (2006.01)
*H04L 1/16* (2006.01)

(52) U.S. Cl.
CPC .......... *H04L 1/0029* (2013.01); *H04L 1/0013* (2013.01); *H04L 1/0643* (2013.01); *H04L 1/1621* (2013.01)

(58) Field of Classification Search
CPC ... H04L 1/0029; H04L 1/0013; H04L 1/0643; H04L 1/1621

(Continued)

(56) References Cited

U.S. PATENT DOCUMENTS

2013/0294357 A1   11/2013   Shimanuki et al.
2018/0198554 A1    7/2018   Wang et al.
(Continued)

FOREIGN PATENT DOCUMENTS

CN    103188050 A    7/2013
CN    104283630 A    1/2015
(Continued)

OTHER PUBLICATIONS

R1-1707851 MediaTek Inc.,"Discussion on CB grouping principles for CBG-based transmission with single/multi-bit HARQ-ACK feedback",3GPP TSG RAN WG1 Meeting #89,Hangzhou, P. R. China May 15-19, 2017,total 6 pages.
(Continued)

*Primary Examiner* — Phong La
(74) *Attorney, Agent, or Firm* — Kilpatrick Townsend & Stockton LLP (57) ABSTRACT

Embodiments provide a data transmission method, a network device, and a terminal device. For achieving this, indication signaling indicating data transmission of one transport block can be sent. The indication signaling carries a status value indicating a quantity of coding block groups in the transport block. The status value further indicates at least one coding block group in the data transmission. The status value is represented by using a maximum of K+1 bits, and K is a maximum value of the quantity of coding block groups that can be included in the transport block. In various embodiments, a network device jointly indicates, by using the status value, the quantity of coding block groups in the transport block and the at least one coding block group included in the data transmission, so that a quantity of bits occupied by the indication signaling is reduced, thereby reducing signaling overheads.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0302208 A1 | 10/2018 | Malladi et al. | |
| 2019/0207734 A1* | 7/2019 | Yang | H04L 1/1614 |
| 2020/0100139 A1* | 3/2020 | Kim | H04W 28/04 |
| 2020/0235759 A1* | 7/2020 | Ye | H03M 13/116 |
| 2020/0236587 A1* | 7/2020 | Kim | H04L 5/00 |
| 2020/0295873 A1* | 9/2020 | Jayasinghe | H04L 1/0061 |
| 2020/0382995 A1* | 12/2020 | Kim | H04W 72/1273 |

FOREIGN PATENT DOCUMENTS

| | | |
|---|---|---|
| CN | 106664186 A | 5/2017 |
| WO | 2017011946 A1 | 1/2017 |

OTHER PUBLICATIONS

R1-1708035 Samsung, "UL scheduling for CBG-based Retransmissions", 3GPP TSG RAN WG1 Meeting #89, Hangzhou, P.R. China May 15-19, 2017, total 3 pages.

CATT: "Further details of CBG-based HARQ transmission", 3GPP DRAFT; R1-1707514, May 14, 2017 (May 14, 2017), XP051272722, total 4 pages.

Lenovo et al: "CBG construction for BBG-based retransmission", 3GPP DRAFT; R1-1707769, May 14, 2017 (May 14, 2017), XP051272972, total 4 pages.

Huawei et al: "On pre-emption indication for DL multiplexing of URLLC and eMBB", 3GPP DRAFT; R1-1708124, May 14, 2017 (May 14, 2017), XP051273320, total 10 pages.

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2018/091595, filed on Jun. 15, 2018, which claims priority to Chinese Patent Application No. 201710459786.7, filed on Jun. 16, 2017. The disclosures of the aforementioned applications are hereby incorporated by reference in their entireties.

TECHNICAL FIELD

This application relates to the communications field, and more In some embodiments, to a data transmission method, a network device, and a terminal device.

BACKGROUND

In a New Radio (New Radio, NR) system, to-be-transmitted data is packaged into several transport blocks (Transport Block, TB). Each transport block may be segmented into several coding blocks (Coding Block, CB), and information is exchanged in a form of coding block group (Coding Block Group, CBG) including a plurality of CBs. A transmit end device may dynamically indicate, to a receive end device, a quantity of CBGs included in one transport block and a currently-transmitted CBG in the TB.

In some embodiments, the transmit end device separately indicates a quantity of CBGs and index indication information of a CBG by using different information fields in dynamic signaling, and therefore signaling resource overheads required in this solution are relatively large.

SUMMARY

Embodiments can provide a data transmission method, a network device, and a terminal device, to reduce signaling resource overheads.

According to a first aspect, a data transmission method is provided, and the method includes: sending indication signaling, where the indication signaling indicates data transmission of one transport block, the indication signaling carries a status value, the status value is used to indicate a quantity of coding block groups included in the transport block, the status value is further used to indicate at least one coding block group included in the data transmission, the status value is represented by using a maximum of K+1 bits, and K is a maximum value of the quantity of coding block groups that can be included in the transport block; and sending the at least one coding block group.

A network device performs joint indication by using the status value, to be specific, the status value indicates the quantity of coding block groups included in the transport block, and is further used to indicate the at least one coding block group included in the data transmission. The status value is represented by using a maximum of K+1 bits, and K is the maximum value of the quantity of coding block groups that can be included in the transport block. Therefore, in this embodiment of this application, a quantity of bits occupied by the indication signaling is reduced, thereby reducing signaling overheads.

In some possible implementations, the status value is determined based on the quantity of coding block groups included in the transport block and the at least one coding block group included in the data transmission.

The network device and a terminal device may predefine a manner of determining the status value. In this way, the terminal device can determine, based on the status value, the quantity of coding block groups included in the transport block and the at least one coding block group included in the data transmission, and does not need to configure a dedicated resource to indicate a correspondence among the status value, the quantity of coding block groups included in the transport block, and the at least one coding block group included in the data transmission, thereby reducing signaling overheads.

In some possible implementations, the method further includes: the network device may send semi-static signaling to the terminal device before sending the indication signaling, where the semi-static signaling is used to indicate the maximum value of the quantity of coding block groups that can be included in the transport block.

The network device pre-notifies the maximum value of the quantity of coding block groups that can be included in the transport block, so that the terminal device can determine, based on the status value, the quantity of coding block groups included in the transport block and the at least one coding block group included in the data transmission, thereby accurately decoding data.

In some possible implementations, the status value, the quantity of coding block groups included in the transport block, and a coding block group included in the data transmission meet the following relational expression: $X=Y+(2^M-a_M)$, where $0 \leq a_M \leq 2+M$, $1 \leq M \leq K$, $a_M$ is an integer, X represents decimal notation of the status value, Y represents decimal notation of a location index value, the location index value is used to indicate a location of the at least one coding block group included in the data transmission in the transport block, and M represents the quantity of coding block groups included in the transport block.

The network device may configure a function relationship among decimal notation of a location index value of a coding block group in a transport block, decimal notation of a status value, and decimal notation of a coding block group included in the transport block, so that the terminal device can determine the other two parameters based on the status value, thereby accurately decoding data.

In some possible implementations, the quantity of coding block groups included in the transport block and a coding block group included in the data transmission meet the following relational expression: $X=Y+(2^M-a_M)$, where $0 \leq a_M \leq 2+M$, $a_M$ is a constant, $1 \leq M \leq K$, X represents decimal notation of the status value, Y represents decimal notation of a location index value, the location index value is used to indicate a location of the at least one coding block group included in the data transmission in the transport block, and M represents the quantity of coding block groups included in the transport block.

The network device may configure another function relationship among decimal notation of a location index value of a coding block group in a transport block, decimal notation of a status value, and decimal notation of a coding block group included in the transport block, so that the terminal device can determine the other two parameters based on the status value, thereby accurately decoding data.

In some possible implementations, the method further includes: receiving feedback information sent by the terminal device, where the feedback information is used to indicate whether the terminal device correctly receives at least one coding block in the transport block, and the feedback information is determined by the terminal device based on the status value.

The network device receives the feedback information, where the feedback information may include at least one bit, and each of the at least one bit is used to indicate whether each coding block in the transport block is correctly received, to determine whether a coding block that is not correctly received needs to be retransmitted, thereby ensuring data transmission quality.

In some possible implementations, the feedback information includes one bit, and the one bit is used to indicate whether the terminal device correctly receives the at least one coding block group in the transport block.

The network device may determine a receiving status of the at least one coding block in the transport block based on a value of the one bit, thereby improving resource utilization.

In some possible implementations, each of the at least one coding block group is a retransmitted coding block group.

The status value carried in the indication signaling that is sent by the network device before the network device retransmits the at least one coding block group may indicate the quantity of coding block groups included in the transport block. In this way, the terminal device can learn of a location of the at least one retransmitted coding block group in the transport block during retransmission, so that the terminal device can accurately decode the at least one coding block group.

In some possible implementations, the at least one coding block group is all coding block groups included in the transport block.

This application may also be applied to a scenario of initially transmitting a coding block, thereby improving application flexibility.

In some possible implementations, the indication signaling is physical layer signaling.

The indication signaling may be physical layer signaling, and the network device may carry the status value by using the physical layer signaling, thereby reducing system power consumption.

According to a second aspect, a data transmission method is provided, and the method further includes: receiving indication signaling, where the indication signaling indicates data transmission of one transport block, the indication signaling carries a status value, the status value is used to indicate a quantity of coding block groups included in the transport block, the status value is further used to indicate at least one coding block group included in the data transmission, the status value is represented by using a maximum of K+1 bits, and K is a maximum value of the quantity, indicated by the indication signaling, of coding block groups that can be included in the transport block; and receiving the at least one coding block group.

A terminal device receives the indication signaling. The status value carried in the indication signaling can jointly indicate the quantity of coding block groups included in the transport block and the at least one coding block group included in the data transmission. The status value is represented by using a maximum of K+1 bits, and K is the maximum value of the quantity of coding block groups that can be included in the transport block, so that a quantity of bits occupied by the indication signaling is reduced, thereby reducing signaling overheads.

In some possible implementations, the method further includes: determining, based on the status value, the quantity of coding block groups included in the transport block.

A network device and the terminal device may predefine a correspondence between a status value and a quantity of coding block groups included in a transport block. In this way, the terminal device can determine, based on the status value, the quantity of coding block groups included in the transport block, and does not need to configure a dedicated resource to indicate the correspondence, thereby reducing signaling overheads.

In some possible implementations, the determining, based on the status value, the quantity of coding block groups included in the transport block includes: determining $M=\max\{n|X \geq 2^n - a_M\}$ based on X, where $1 \leq M \leq K$, $a_M$ is an integer, X represents decimal notation of the status value, and M represents the quantity of coding block groups included in the transport block.

The terminal device may learn of a function relationship that is configured by the network device and that is between decimal notation of a status value and decimal notation of a coding block group included in a transport block, and can determine a quantity of coding block groups included in the transport block based on the status value, thereby accurately decoding data.

In some possible implementations, the determining, based on the status value, at least one coding block group included in the transport block includes:

determining $Y = X - (2^M - a_M)$ based on X and M, where $0 \leq a_M \leq 2 + M$, $a_M$ is a constant and is an integer, X represents the decimal notation of the status value, Y represents decimal notation of a location index value, the location index value is used to indicate a location of the at least one coding block group included in the data transmission in the transport block, and M represents the quantity of coding block groups included in the transport block.

The terminal device may learn of a function relationship that is configured by the network device and that is between decimal notation of a status value and decimal notation of a coding block group included in a transport block, and can determine a quantity of coding block groups included in the transport block based on the status value, thereby accurately decoding data.

In some possible implementations, the method further includes: determining, based on the status value, at least one coding block group included in the transport block.

The network device and the terminal device may predefine a correspondence between a status value and at least one coding block group included in data transmission. In this way, the terminal device can determine, based on the status value, the at least one coding block group included in the data transmission, and does not need to configure a dedicated resource to indicate the correspondence, thereby reducing signaling overheads.

In some possible implementations, the determining, based on the status value, at least one coding block group included in the transport block includes:

determining $Y = X - (2^M - a_M)$ based on X and M, where $0 \leq a_M \leq 2 + M$, $a_M$ is an integer, X represents the decimal notation of the status value, Y represents decimal notation of a location index value, the location index value is used to indicate a location of the at least one coding block group included in the data transmission in the transport block, and M represents the quantity of coding block groups included in the transport block.

The terminal device may learn of a function relationship that may be configured by the network device and that is among decimal notation of a location index value of a coding block group in a transport block, decimal notation of a status value, and decimal notation of a quantity of coding block groups included in the transport block, to determine the location index value based on the status value, thereby accurately decoding data.

In some possible implementations, the method further includes: determining feedback information based on the status value; and sending the feedback information to the network device.

The terminal device may determine the feedback information based on the status value, where the feedback information is used to indicate whether the terminal device correctly receives the at least one coding block group in the transport block; and send the feedback information, so that the network device determines whether a coding block group that is not correctly received needs to be retransmitted, thereby ensuring data transmission quality.

In some possible implementations, the feedback information includes one bit, and the one bit is used to indicate whether the terminal device correctly receives the at least one coding block in the transport block.

The terminal device can fully use the invalid status value to improve resource utilization while reducing calculation power consumption and shortening a latency.

In some possible implementations, each of the at least one coding block group is a retransmitted coding block group.

Before receiving the at least one retransmitted coding block group, the terminal device may further receive the indication signaling sent by the network device. The status value carried in the indication signaling may indicate the quantity of coding block groups included in the transport block. In this way, the terminal device can learn of a location of the at least one retransmitted coding block group in the transport block during retransmission, thereby accurately decoding the at least one coding block group.

In some possible implementations, the at least one coding block group is all coding block groups included in the transport block.

This application may also be applied to a scenario of initially transmitting a coding block, thereby improving application flexibility.

In some possible implementations, the indication signaling is physical layer signaling.

The indication signaling may be physical layer signaling, and the network device may carry the status value by using the physical layer signaling, thereby reducing system power consumption.

According to a third aspect, a network device is provided. The network device includes a module for performing the method in any one of the first aspect or the possible implementations of the first aspect.

According to a fourth aspect, a terminal device is provided. The terminal device includes a module for performing the method in any one of the second aspect or the possible implementations of the second aspect.

According to a fifth aspect, a system is provided, and the system includes:

the network device in the third aspect and the terminal device in the fourth aspect.

According to a sixth aspect, a network device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in any one of the first aspect or the possible implementations of the first aspect.

According to a seventh aspect, a terminal device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method in any one of the second aspect or the possible implementations of the second aspect.

According to an eighth aspect, a computer storage medium is provided. The computer storage medium stores program code, and the program code is used to indicate an instruction for performing the method in any one of the first aspect or the possible implementations of the first aspect.

According to a ninth aspect, a computer storage medium is provided. The computer storage medium stores program code, and the program code is used to indicate an instruction for performing the method in any one of the second aspect or the possible implementations of the second aspect.

According to a tenth aspect, a system chip is provided, and the system chip includes an input/output interface, at least one processor, at least one memory, and a bus. The at least one memory is configured to store an instruction, and the at least one processor is configured to invoke the instruction in the at least one memory to perform operations in the methods in the foregoing aspects.

Based on the foregoing solutions, by using the status value, the network device indicates the quantity of coding block groups included in the transport block, and further indicates the at least one coding block group included in the data transmission. In other words, the network device jointly indicates, by using the status value, the quantity of coding block groups included in the transport block and the at least one coding block group included in the data transmission, so that a quantity of bits occupied by the indication signaling is reduced, thereby reducing signaling overheads.

DESCRIPTION OF EMBODIMENTS

The following describes the technical solutions in this application with reference to the accompanying drawings.

The technical solutions in the embodiments of this application may be applied to various communications systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be alternatively a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, a terminal device in a future evolved public land mobile network (Public Land Mobile Network, PLMN), or the like. This is not limited in the embodiments of this application.

A network device in the embodiments of this application may be a device for communicating with the terminal device. The network device may be a base transceiver station (Base Transceiver Station, BTS) in a global system for mobile communications (Global System of Mobile communication, GSM) or in a code division multiple access (Code Division Multiple Access, CDMA) system, or may be a NodeB (NodeB, NB) in a wideband code division multiple access (Wideband Code Division Multiple Access, WCDMA) system, or may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
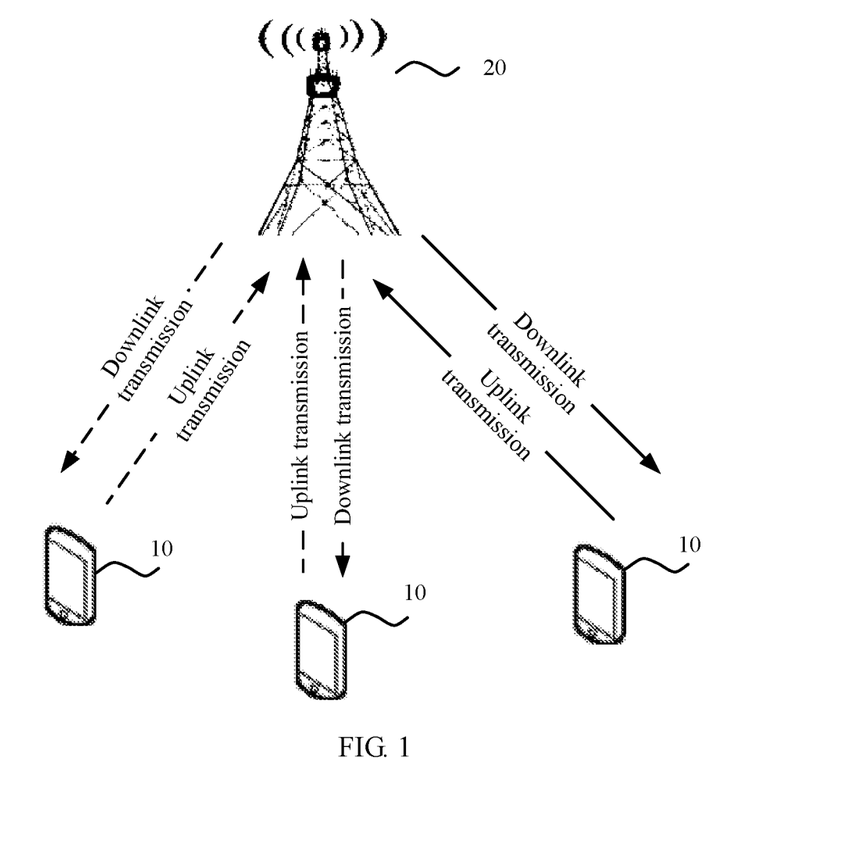
FIG. 1 is a schematic diagram of an application scenario according to this application.

FIG. 1 is a schematic diagram of an application scenario according to this application. A communications system in FIG. 1 may include a plurality of user equipments 10 and a network device 20. The network device 20 is configured to provide a communication service for each user equipment 10 and access a core network, and each user equipment 10 accesses a network by searching for a synchronization signal, a broadcast signal, and the like that are sent by the network device 20, to communicate with the network. An arrow shown in FIG. 1 may indicate uplink/downlink transmission performed by using a cellular link between the user equipment 10 and the network device 20.

In an NR system, a media access control (Media Access Control, MAC) layer of a transmit end device packages to-be-transmitted data into several transport blocks, and then delivers the transport blocks to a physical layer of the transmit end device. A quantity of transport blocks that can be processed by the physical layer of the transmit end device in one transmission time interval (Transmission Time Interval, TTI) is related to a quantity of transport layers that can be supported by a physical channel between the transmit end device and a receive end device. In some embodiments, when the quantity of transport layers that can be supported by the physical channel of the transmit end device is less than or equal to 4, the physical layer can process only one transport block in one TTI; when the quantity of transport layers that can be supported by the physical channel is greater than 4, the physical layer can process two transport blocks in one TTI.

It should be understood that if there are a plurality of receive end devices in a cell, a transmit device may process one or two TBs for each receive end device.

Figure 2:
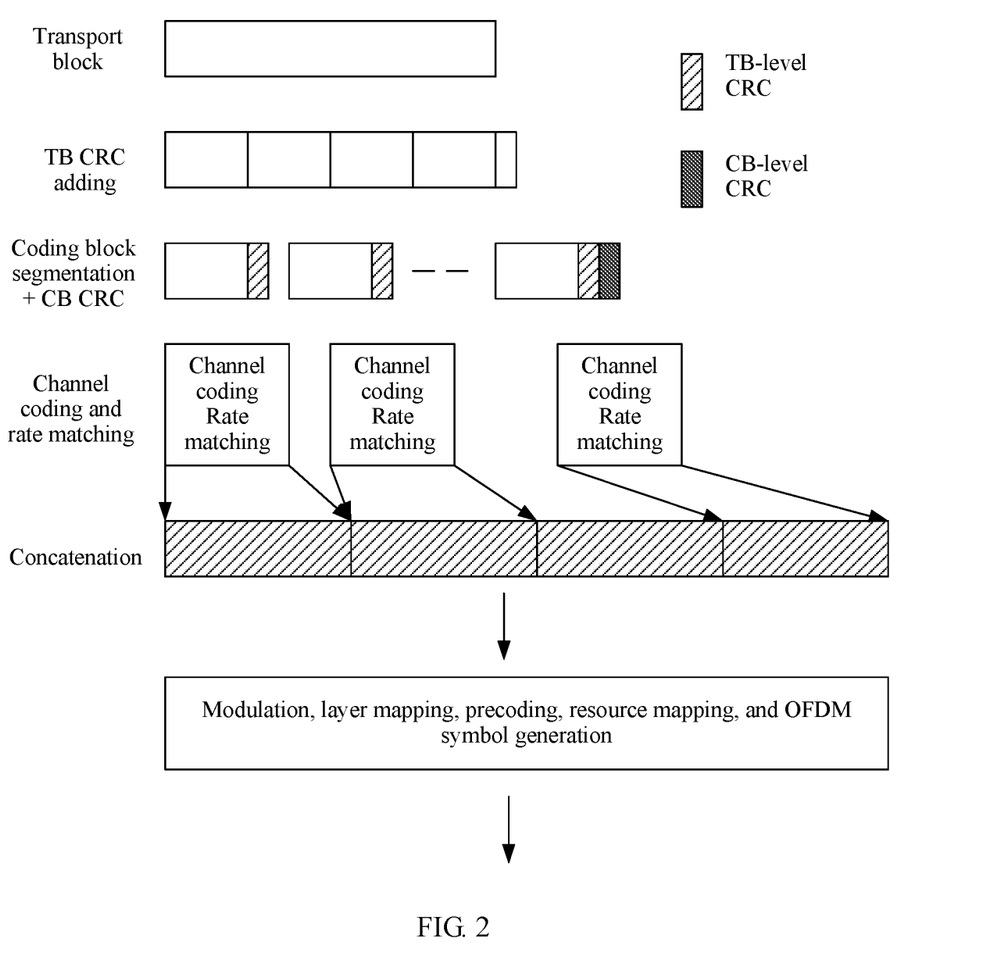
FIG. 2 is a schematic flowchart of data processing.

FIG. 2 is a schematic flowchart of data processing. As shown in FIG. 2, when receiving one or two transport blocks delivered by a MAC layer, a physical layer of a transmit end device first adds a transport block-level cyclic redundancy check (Cyclic Redundancy Check, CRC) check bit to each transport block, so that a receive end device can detect, by using the CRC check bit, whether each transport block is correctly received. Then, the physical layer of the transmit end device performs coding block segmentation on data of each transport block, to be specific, each transport block that is packaged and delivered by the MAC layer is segmented into several coding blocks (Coding Block, CB), and a quantity of obtained coding blocks and a quantity of data bits in each coding block are related to another parameter, for example, a size of the transport block or a quantity of bits allowed by the coding block. Then, the physical layer of the transmit end device performs coding-level CRC check bit adding, channel coding, and rate matching on each coding block, and cascades data of all coding blocks. Finally, the physical layer of the transmit end device performs a series of operations such as modulation, layer mapping, precoding, resource mapping, and OFDM symbol generation on each transport block obtained after the coding block cascading, to obtain a final transmit signal, and send the transmit signal to the receive end device.

As shown in FIG. 2, each CB corresponds to separate CRC, in other words, the receive end device may accurately learn of, through CRC check, a CB whose data is correctly received. The receive end device may report a receiving status of each CB to the transmit end device. For example, the transmit end device sends N CBs to the receive end device, and the receive end device may report, to the transmit end device by using N bits, whether each CB is correctly received. If each CB is correctly received, the receive end device reports an acknowledgement (acknowledgement, ACK), or if each CB is not correctly received, the receive end device reports a negative acknowledgement (Negative Acknowledgement, NACK). In addition, after learning of the receiving status of each CB, the transmit end device may retransmit, to the receive end device, a CB that is not correctly received. This process may be referred to as a "CB-level hybrid automatic repeat request (Hybrid Automatic Repeat Request, HARQ)".

Because a rate that can be supported by an NR system is significantly increased, each TB can be segmented into a larger quantity of CBs. Consequently, the CB-level HARQ causes relatively large information exchange overheads. For example, when N=100, a receive end needs to report the receiving status of each CB to a transmit apparatus by using 100 bits.

Therefore, in the NR, a plurality of CBs form one CBG, and information is exchanged in a form of CBG.

In some embodiments, the transmit end device may dynamically indicate, to the receive end device, a quantity of coding block groups (Coding Block Group, CBG) included in one transport block (Transport Block, TB) and a currently-transmitted (or retransmitted) CBG in the TB. For example, if one TB may be segmented into a maximum of K CBGs, the transmit end device needs to indicate, by using $\log_2 K$ bits, a quantity of CBGs included in one TB. In addition, the transmit end device further requires K bits to indicate a location of a CBG that is transmitted or retransmitted at a current moment and that is in a TB to which the CBG belongs. For example, each of the K bits corresponds to each CBG in the TB, and whether a corresponding CBG is transmitted is determined based on a bit value. In some embodiments, if the bit value is 1, the CBG corresponding to the bit is transmitted; if the bit value is 0, the CBG corresponding to the bit is not transmitted.

In a conventional solution, the transmit end device separately indicates a quantity of CBGs and index indication information of a CBG by using different information fields in dynamic signaling, and therefore required signaling resource overheads are relatively large.

Figure 3:
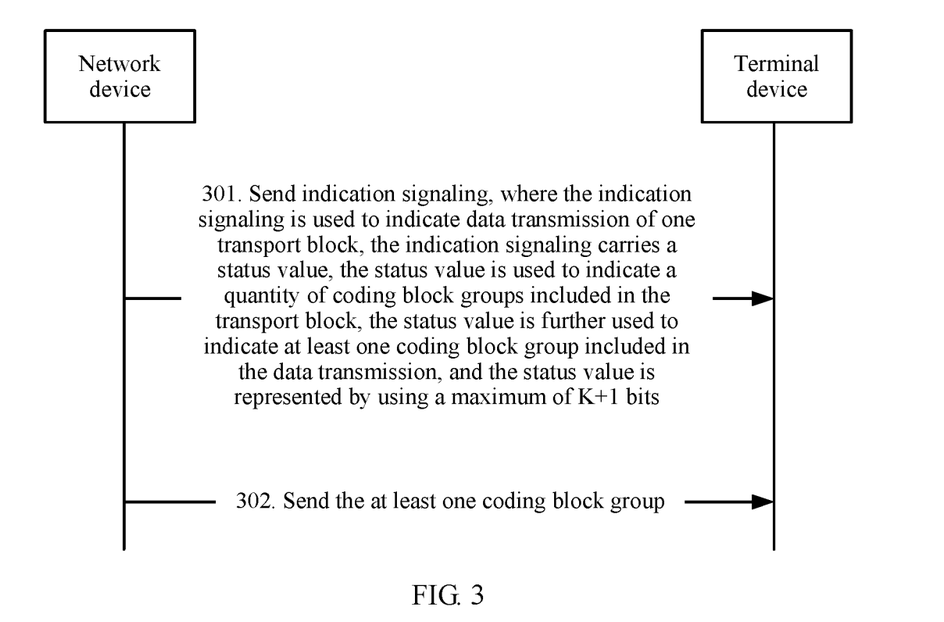
FIG. 3 is a schematic flowchart of data transmission according to an embodiment of this application.

FIG. 3 is a schematic flowchart of data transmission according to an embodiment of this application.

301. A network device sends indication signaling, where the indication signaling indicates data transmission of one transport block, the indication signaling carries a status value, the status value is used to indicate a quantity of coding block groups included in the transport block, the status value is further used to indicate at least one coding block group included in the data transmission, the status value is represented by using a maximum of K+1 bits, and K is a maximum value of the quantity of coding block groups that can be included in the transport block. Correspondingly, a terminal device receives the indication signaling.

In some embodiments, a location of each of the at least one coding block group included in the data transmission in the transport block is determined. K is a maximum value of a quantity of coding block groups into which the transport block can be segmented, and the K+1 bits may indicate $2^{K+1}$ status values.

One status value may indicate the quantity of coding block groups included in the transport block, and may further indicate the at least one coding block group included in the data transmission. In other words, the network device performs joint indication by using the status value, so that a quantity of bits occupied by the indication signaling is reduced, thereby reducing signaling overheads.

For example, as shown in Table 1, if a quantity of CBGs is 1, there is $C_1^1=1$ possible case of a currently transmitted CBG; if a quantity of CBGs is 2, there is $C_2^2$ possible case ([1 1]) when a quantity of currently transmitted CBGs is 2 and there are $C_2^1$ possible cases [1 0] and [0 1] when a quantity of currently transmitted CBGs is 1; if a quantity of CBGs is n, there are $C_n^1+C_n^2+\ldots+C_n^n=2^n-1$ possible cases of currently transmitted CBGs. If a maximum value of a quantity of CBGs that can be included in one TB is K, a quantity of required status values is $\Sigma_{n=1}^{K}(2^n-1)=2^{K+1}-2-K$, and K+1 bits can represent $2^{K+1}$ status values. Therefore, the K+1 bits are enough to represent $\Sigma_{n=1}^{K}(2^n-1)=2^{K+1}-2-K$ status values. Compared with a conventional solution in which the indication signaling needs to occupy $\log_2 K+K$ bits, signaling overheads are reduced in this solution.

TABLE 1

| Status value (X) | CBG quantity (M) | CBG location index value (Y) |
|---|---|---|
| 0 | 1 | 1 |
| 1 | 2 | [0 1] |
| 2 |  | [1 0] |
| 3 |  | [1 1] |
| 4 | 3 | [0 0 1] |
| 5 |  | [0 1 0] |
| 6 |  | [0 1 1] |
| 7 |  | [1 0 0] |
| 8 |  | [1 0 1] |
| ... |  | ... |

The CBG location index value (Y) may be represented by using a bitmap (bitmap). M CBGs are represented by using M bits, and each bit corresponds to one CBG. When a bit value is 1, it indicates that a corresponding CBG exists, or a corresponding CBG is transmitted; when a bit value is 0, it indicates that a corresponding CBG does not exist, or a corresponding CBG is not transmitted.

It should be understood that the status value indicates the quantity of coding block groups included in the transport block, and indicates the at least one coding block group included in the data transmission. Alternatively, the quantity of coding block groups included in the transport block and the at least one coding block group included in the data transmission may be indicated in another manner, and this is not limited in this application.

In some embodiments, the method further includes: the network device may send semi-static signaling to the terminal device before sending the indication signaling, where the semi-static signaling is used to indicate the maximum value of the quantity of coding block groups that can be included in the transport block.

It should be understood that the semi-static signaling may be RRC signaling.

In some embodiments, there may be a mapping relationship among a status value, a CBG quantity, and a CBG location index value. The CBG location index value is used to indicate a location of a CBG in a transport block. In other words, the network device or the terminal device may predefine the mapping relationship. In this way, the network device sends the status value to the terminal device, so that the terminal device can determine the CBG quantity and the location of the CBG in the transport block based on the status value.

In some embodiments, the network device can learn of the quantity of coding block groups included in the transport block and at least one to-be-transmitted coding block group, so that the network device can determine the status value based on the quantity of coding block groups included in the transport block and the at least one coding block group included in the data transmission. In other words, there may be a function correspondence among the status value, the quantity of coding block groups included in the transport block, and the at least one coding block group included in the data transmission.

In some embodiments, the network device determines the status value based on the quantity of coding block groups included in the transport block and the at least one coding block group included in the data transmission. In some embodiments, the status value, the quantity of coding block groups included in the transport block, and a coding block group included in the data transmission may meet the following relational expression:

$X=Y+(2^M-(M+2))$, where $1 \leq M \leq K$, X represents decimal notation of the status value, Y represents decimal notation of a location index value, the location index value is used to indicate a location of the at least one coding block group included in the data transmission in the transport block, and M represents the quantity of coding block groups included in the transport block.

It should be noted that in this embodiment, each status value is a valid value, the status value may be in a one-to-one correspondence with the location index value of the CBG, and a plurality of status values may correspond to one quantity of CBGs.

For example, as shown in Table 1, X is 1, M is 2, and Y is [0 1]=1, to be specific, $1=1+(2^2-(2+2))$.

In some embodiments, some invalid values are inserted into Table 1 in this embodiment of this application. For example, in Table 2, when a quantity of CBGs is 1, there is $C_1^1=1$ possible case of a currently transmitted CBG, and if an invalid state is added, a quantity of status values is $2^1$; when a quantity of CBGs is 2, there is $C_2^2$ possible case ([1 1]) when a quantity of currently transmitted CBGs is 2 and there are $C_2^1$ possible cases [1 0] and [0 1] when a quantity of currently transmitted CBGs is 1, and if an invalid state is added, a total quantity of statuses is $2^2$; when a quantity of CBGs is n, there are $C_n^1+C_n^2+\ldots+C_n^n=2^n-1$ possible cases of currently transmitted CBGs, and if an invalid state is added, a total quantity of statuses is $2^n$. In this way, when a maximum value of the quantity of CBGs is K, a total quantity of statuses required for notifying the quantity of CBGs and CBG location information is $\Sigma_{n=1}^{K}(2^n)=2^{K+1}-2$ thereby simplifying a formula, reducing calculation power consumption, and shortening a latency.

TABLE 2

| Status value (X) | CBG quantity (M) | CBG location index value (Y) |
|---|---|---|
| 0 | 1 | 0 |
| 1 |   | 1 |
| 2 | 2 | [0 0] |
| 3 |   | [0 1] |
| 4 |   | [1 0] |
| 5 |   | [1 1] |
| 6 | 3 | [0 0 0] |
| 7 |   | [0 0 1] |
| 8 |   | [0 1 0] |
| 9 |   | [0 1 1] |
| 10 |   | [1 0 0] |
| 11 |   | [1 0 1] |
| ... |   | ... |

In some embodiments, it may be learned from Table 2 that the status value, the quantity of coding block groups included in the transport block, and a coding block group included in the data transmission meet the following relational expression:

$$X=Y+(2^M-2),$$

where $1 \leq M \leq K$, X represents decimal notation of the status value, Y represents decimal notation of a location index value, the location index value is used to indicate a location of the at least one coding block group included in the data transmission in the transport block, and M represents the quantity of coding block groups included in the transport block.

For example, X is 2, M is 2, and Y is [0 0]=0, to be specific, $2=0+(2^2-2)$.

In some embodiments, the status value, the quantity of coding block groups included in the transport block, and a coding block group included in the data transmission may alternatively meet the following relational expression: $X=Y+(2^M-a_M)$, where $0 \leq a_M \leq 2+M$, $1 \leq M \leq K$, $a_M$ is an integer, X represents decimal notation of the status value, Y represents decimal notation of a location index value, the location index value is used to indicate a location of the at least one coding block group included in the data transmission in the transport block, and M represents the quantity of coding block groups included in the transport block. A value of $a_M$ depends on a value of M.

It should be noted that $a_M$ may be a function related to M, to be specific, $a_M=f(M)$.

Alternatively, $a_M$ may be a constant that does not depend on M, for example, 0, 1, or 2.

In some embodiments, as shown in Table 3, $X=Y+(2^M-1)$; as shown in Table 4, $X=Y+(2^M-2)$; as shown in Table 5, $X=Y+2^M$.

For example, in Table 3, X is 8, M is 3, and Y is [0 0 1]=1, to be specific, $8=1+(2^3-1)$.

It should be noted that the status value, the quantity of coding block groups included in the transport block, and a coding block group included in the data transmission may alternatively meet another relationship. This is not limited in this application.

TABLE 3

| Status value (X) | CBG quantity (M) | CBG location index value (Y) |
|---|---|---|
| 1 | 1 | 0 |
| 2 |   | 1 |
| 3 | 2 | [0 0] |
| 4 |   | [0 1] |
| 5 |   | [1 0] |
| 6 |   | [1 1] |
| 7 | 3 | [0 0 0] |
| 8 |   | [0 0 1] |
| 9 |   | [0 1 0] |
| 10 |   | [0 1 1] |
| 11 |   | [1 0 0] |
| 12 |   | [1 0 1] |
| ... |   | ... |

TABLE 4

| Status value (X) | CBG quantity (M) | CBG location index value (Y) |
|---|---|---|
| 0 | 1 | 1 |
| 1 | 2 | [0 0] |
| 2 |   | [0 1] |
| 3 |   | [1 0] |
| 4 |   | [1 1] |
| 5 | 3 | [0 0 0] |
| 6 |   | [0 0 1] |
| 7 |   | [0 1 0] |
| 8 |   | [0 1 1] |
| 9 |   | [1 0 0] |
| 10 |   | [1 0 1] |
| ... |   | ... |

In some embodiments, the status value, the quantity of coding block groups included in the transport block, and a coding block group included in the data transmission may alternatively meet the following relational expression: $X=Y+(2^M-a_M)$, where $0 \leq a_M \leq 2$, $1 \leq M \leq K$, $a_M$ is a constant and is an integer, X represents decimal notation of the status value, Y represents decimal notation of a location index value, the location index value is used to indicate a location of the at least one coding block group included in the data transmission in the transport block, and M represents the quantity of coding block groups included in the transport block.

In some embodiments, $a_M$ does not depend on the quantity M of coding block groups included in the transport block. For example, as shown in Table 5, if X is 2, M is 1, and $a_M$ is 0, Y=0. In other words, an invalid value may be inserted into CBG location index values corresponding to some quantities of CBGs.

TABLE 5

| Status value (X) | CBG quantity (M) | CBG location index value (Y) |
|---|---|---|
| 2 | 1 | 0 |
| 3 | | 1 |
| 4 | 2 | [0 0] |
| 5 | | [0 1] |
| 6 | | [1 0] |
| 7 | | [1 1] |
| 8 | 3 | [0 0 0] |
| 9 | | [0 0 1] |
| 10 | | [0 1 0] |
| 11 | | [0 1 1] |
| 12 | | [1 0 0] |
| 13 | | [1 0 1] |
| ... | | ... |

In some embodiments, the network device and the terminal device may agree on another function of the invalid status value in advance, so that the network device can fully use the invalid status value to further improve resource utilization while reducing calculation power consumption and shortening a latency.

In some embodiments, a CBG location index corresponding to an invalid state may be used to indicate a transmission type of a CBG. In other words, if a CBG location index value corresponding to a status value is in an invalid state, the network device may set a transmission type of the CBG corresponding to the invalid state to be the same as that of a CBG corresponding to another status value.

For example, in Table 2, when the status value is 2, the CBG quantity is 2, and the CBG location index is in an invalid state, the network device may indicate, when the status value is 2, that transmission types of the CBGs are that both the two CBGs are transmitted, or indicate that either of the CBGs is transmitted. This is not limited in this application.

In some embodiments, the terminal device may determine feedback information based on the status value. In some embodiments, the terminal device determines, based on the status value, that the terminal device may receive at least one coding block in the transport block. In this way, the feedback information needs to include at least one bit, and each of the at least one bit is used to indicate whether each of the at least one coding block is correctly received.

In some embodiments, the terminal device receives the indication signaling, and the status value carried in the indication signaling is 5, as shown in Table 2. Then, a PDSCH that may be received by the terminal device includes two CBGs. The terminal device detects and decodes the PDSCH to obtain information bits of the two CBGs, determines, through check, whether the two CBGs are correctly received, and notifies the network device of a receiving result by feeding back a 2-bit HARQ ACK to the network device. For example, if the HARQ ACK fed back by the terminal device is [1 1], it indicates that both the two CBGs are correctly received.

It should be understood that the at least one coding block in the transport block indicated by the feedback information may be all coding blocks in the transport block, or may be several preset coding blocks. This is not limited in this application.

In some embodiments, when a CBG location index is in an invalid state, the feedback information may include only one bit.

In some embodiments, as shown in Table 2, if the network device sets the status value to 2, it indicates that both the two CBGs are transmitted. After checking whether the two CBGs are correctly received, the terminal device may perform a feedback through bundling (bundling). To be specific, the feedback information occupies only one bit to indicate a receiving result of the CBGs.

In some embodiments, two HARQ ACKs may be "multiplied". If a HARQ ACK is [1 1], a bundling result is 1; if a HARQ ACK is [0 1], [1 0], or [0 0], a bundling result is 0.

In some embodiments, the indication signaling may be physical layer signaling, for example, physical downlink control channel (Physical Downlink Control Channel, PDCCH) signaling.

In some embodiments, the terminal device receives the indication signaling, and may determine, based on the status value carried in the indication signaling, the quantity of coding block groups included in the transport block.

In some embodiments, that the terminal device determines, based on the status value, the quantity of coding block groups included in the transport block includes:

determining $M = \max\{n | X \geq 2^n - a_M\}$ based on X, where $0 \leq a_M \leq 2+M$, n is an integer, X represents decimal notation of the status value, Y represents decimal notation of a location index value, the location index value is used to indicate a location of the at least one coding block group included in the data transmission in the transport block, and M represents the quantity of coding block groups included in the transport block.

For example, corresponding to Table 2, if X is 2 and $a_M$ is 2, M=2.

In some embodiments, the terminal device may further determine, based on the status value, the at least one coding block group included in the data transmission. To be specific, the terminal device may determine a location that is in the transport block and that is of each of the at least one coding block group in the transport block.

In some embodiments, the determining, based on the status value, the at least one coding block group included in the data transmission includes:

determining $Y = X - (2^M - a_M)$ based on X and M, where $0 \leq a_M \leq 2+M$, X represents the decimal notation of the status value, Y represents decimal notation of a location index value, the location index value is used to indicate a location of the at least one coding block group included in the data transmission in the transport block, and M represents the quantity of coding block groups included in the transport block.

It should be noted that a specific value of $a_M$ may be a value agreed on in advance by the network device and the terminal device, or the network device indicates a value of $a_M$ by using other signaling or carrying other indication information. This is not limited in this application.

For example, corresponding to Table 2, if X is 2, $a_M$ is 2, and M=2, Y=0, namely, [0 0].

302. The network device sends the at least one coding block group. Correspondingly, the terminal device receives the at least one coding block group.

In some embodiments, each of the at least one coding block group is a retransmitted coding block group. In other words, after the network device initially transmits the transport block, the terminal device does not correctly decode the at least one coding block group. Therefore, the network device retransmits the at least one coding block group.

In some embodiments, the status value carried in the indication signaling that is sent by the network device before the network device retransmits the at least one coding block group may indicate the quantity of coding block groups included in the transport block. In this way, the terminal device can learn of a location of the at least one retransmitted coding block group in the transport block during retransmission, so that the terminal device can accurately decode the at least one coding block group.

In some embodiments, the at least one coding block group may be all coding block groups included in the transport block, in other words, the network device initially transmits the transport block.

Therefore, in the data transmission method in this embodiment of this application, by using the status value, the network device indicates the quantity of coding block groups included in the transport block, and further indicates the at least one coding block group included in the data transmission. In other words, the network device jointly indicates, by using the status value, the quantity of coding block groups included in the transport block and the at least one coding block group included in the data transmission, so that a quantity of bits occupied by the indication signaling is reduced, thereby reducing signaling overheads.

Figure 4:
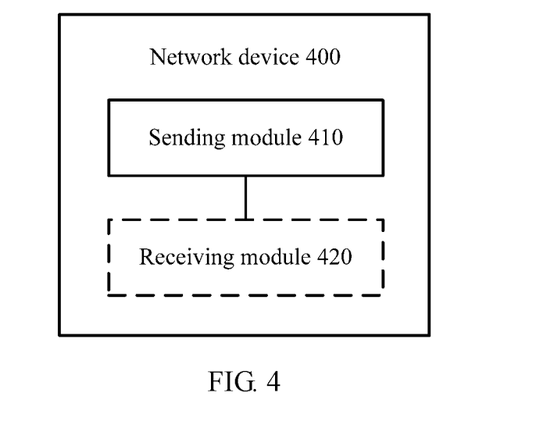
FIG. 4 is a schematic block diagram of a network device according to an embodiment of this application.

FIG. 4 is a schematic block diagram of a network device 400 according to an embodiment of this application. As shown in FIG. 4, the network device 400 includes:

a sending module 410, configured to send indication signaling, where the indication signaling indicates data transmission of one transport block, the indication signaling carries a status value, the status value is used to indicate a quantity of coding block groups included in the transport block, the status value is further used to indicate at least one coding block group included in the data transmission, the status value is represented by using a maximum of K+1 bits, and K is a maximum value of the quantity of coding block groups that can be included in the transport block.

The sending module 410 is further configured to send the at least one coding block group.

In some embodiments, the status value is determined based on the quantity of coding block groups included in the transport block and the at least one coding block group included in the data transmission.

In some embodiments, the status value, the quantity of coding block groups included in the transport block, and a coding block group included in the data transmission meet the following relational expression: $X=Y+(2^M-a_M)$, where $0 \leq a_M \leq 2+M$, $1 \leq M \leq K$, $a_M$ is an integer, X represents decimal notation of the status value, Y represents decimal notation of a location index value, the location index value is used to indicate a location of the at least one coding block group included in the data transmission in the transport block, and M represents the quantity of coding block groups included in the transport block.

In some embodiments, the quantity of coding block groups included in the transport block and a coding block group included in the data transmission meet the following relational expression: $X=Y+(2^M-a_M)$, where $0 \leq a_M \leq 2+M$, $a_M$ is a constant, $1 \leq M \leq K$, X represents decimal notation of the status value, Y represents decimal notation of a location index value, the location index value is used to indicate a location of the at least one coding block group included in the data transmission in the transport block, and M represents the quantity of coding block groups included in the transport block.

In some embodiments, the network device 400 further includes:

a receiving module 420, configured to receive feedback information sent by a terminal device, where the feedback information is used to indicate whether the terminal device correctly receives at least one coding block group in the transport block, and the feedback information is determined by the terminal device based on the status value.

In some embodiments, the feedback information includes one bit, and the one bit is used to indicate whether the terminal device correctly receives the at least one coding block group in the transport block.

In some embodiments, each of the at least one coding block group is a retransmitted coding block group.

In some embodiments, the at least one coding block group is all coding block groups included in the transport block.

In some embodiments, the indication signaling is physical layer signaling.

Therefore, the network device in this embodiment of this application performs joint indication by using the status value, to be specific, the status value indicates the quantity of coding block groups included in the transport block, and is further used to indicate the at least one coding block group included in the data transmission. The status value is represented by using a maximum of K+1 bits, and K is the maximum value of the quantity of coding block groups that can be included in the transport block. In this embodiment of this application, a quantity of bits occupied by the indication signaling is reduced, thereby reducing signaling overheads.

It should be understood that the network device 400 in this embodiment of this application may correspond to the network device in the resource allocation method 300 in the embodiments of this application, and the foregoing and other management operations and/or functions of the modules in the network device 400 are separately used to implement corresponding steps of the method. For brevity, details are not described herein again.

Figure 5:
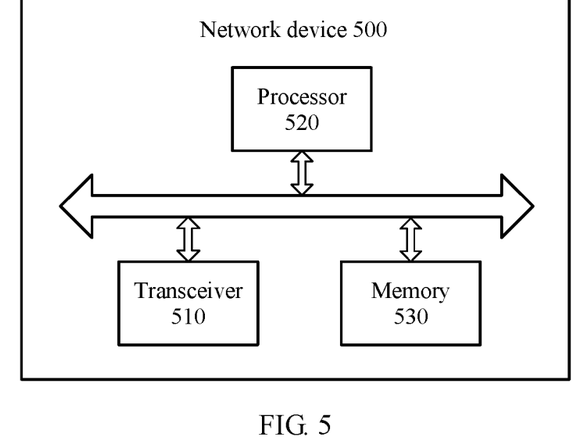
FIG. 5 is a schematic structural diagram of a network device according to an embodiment of this application.

The sending module 410 and the receiving module 420 in this embodiment of this application may be implemented by a transceiver. As shown in FIG. 5, a network device 500 may include a transceiver 510, a processor 520, and a memory 530. The memory 530 may be configured to store indication information, and may be further configured to store code, an instruction, and the like executed by the processor 520.

Figure 6:
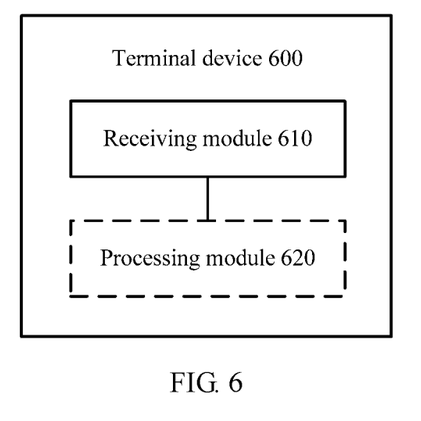
FIG. 6 is a schematic block diagram of a terminal device according to an embodiment of this application.

FIG. 6 is a schematic block diagram of a terminal device 600 according to an embodiment of this application. As shown in FIG. 6, the terminal device 600 includes:

a receiving module 610, configured to receive indication signaling, where the indication signaling indicates data transmission of one transport block, the indication signaling carries a status value, the status value is used to indicate a quantity of coding block groups included in the transport block, the status value is further used to indicate at least one coding block group included in the data transmission, the status value is represented by using a maximum of K+1 bits, and K is a maximum value of the quantity, indicated by the indication signaling, of coding block groups that can be included in the transport block.

The receiving module 610 is further configured to receive the at least one coding block group.

In some embodiments, the terminal device 600 further includes:

a processing module 620, configured to determine, based on the status value, the quantity of coding block groups included in the transport block.

In some embodiments, the processing module 620 is In some embodiments configured to:

determine $M=\max\{n|X \geq 2^n - a_M\}$ based on $X$, where $1 \leq M \leq K$, $a_M$ is an integer, X represents decimal notation of the status value, and M represents the quantity of coding block groups included in the transport block.

In some embodiments, the processing module 620 is further configured to determine, based on the status value, at least one coding block group included in the transport block.

In some embodiments, the processing module 620 is In some embodiments configured to:

determine $Y=X-(2^M - a_M)$ based on $X$ and $M$, where $0 \leq a_M \leq 2+M$, $1 \leq M \leq K$, $a_M$ is a positive integer, X represents the decimal notation of the status value, Y represents decimal notation of a location index value, the location index value is used to indicate a location of the at least one coding block group included in the data transmission in the transport block, and M represents the quantity of coding block groups included in the transport block.

In some embodiments, the processing module 620 is In some embodiments configured to:

determine $Y=X-(2^M - a_M)$ based on $X$ and $M$, where $0 \leq a_M \leq 2+M$, $a_M$ is a constant and is an integer, X represents the decimal notation of the status value, Y represents decimal notation of a location index value, the location index value is used to indicate a location of the at least one coding block group included in the data transmission in the transport block, and M represents the quantity of coding block groups included in the transport block.

In some embodiments, the processing module is further configured to determine feedback information based on the location index value and the status value, where the feedback information is used to indicate whether the terminal device correctly receives the at least one coding block group in the transport block.

The terminal device 600 further includes:

a sending module, configured to send the feedback information to a network device.

In some embodiments, the feedback information includes one bit, and the one bit is used to indicate whether the terminal device correctly receives the at least one coding block group in the transport block.

In some embodiments, each of the at least one coding block group is a retransmitted coding block group.

In some embodiments, the at least one coding block group is all coding block groups included in the transport block.

In some embodiments, the indication signaling is physical layer signaling.

Therefore, the terminal device in this embodiment of this application receives the indication signaling. The status value carried in the indication signaling can jointly indicate the quantity of coding block groups included in the transport block and the at least one coding block group included in the data transmission. The status value is represented by using a maximum of K+1 bits, and K is the maximum value of the quantity of coding block groups that can be included in the transport block, so that a quantity of bits occupied by the indication signaling is reduced, thereby reducing signaling overheads.

It should be understood that the terminal device 600 in this embodiment of this application may correspond to the terminal device in the resource allocation method 300 in the embodiments of this application, and the foregoing and other management operations and/or functions of the modules in the terminal device 600 are separately used to implement corresponding steps of the method. For brevity, details are not described herein again.

Figure 7:
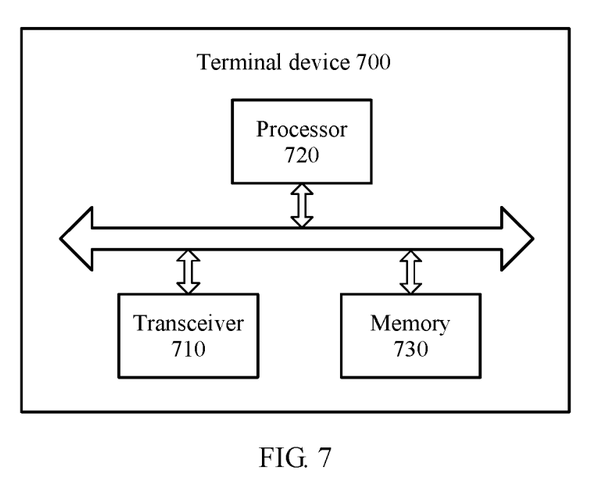
FIG. 7 is a schematic structural diagram of a terminal device according to an embodiment of this application.

In this embodiment of this application, the receiving module 610 may be implemented by a transceiver, and the processing module 620 may be implemented by a processor. As shown in FIG. 7, a terminal device 700 may include a transceiver 710, a processor 720, and a memory 730. The memory 730 may be configured to store indication information, and may be further configured to store code, an instruction, and the like executed by the processor 720.

It should be understood that the processor 520 or the processor 720 may be an integrated circuit chip with a signal processing capability. In an implementation process, the steps in the foregoing method embodiments may be implemented by using a hardware integrated logic circuit in the processor, or by using an instruction in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA), another programmable logic device, a discrete gate, a transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware in the processor.

It may be understood that the memory 530 or the memory 730 in the embodiments of the present invention may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous Link DRAM, SLDRAM), and a direct rambus random access memory (Direct Rambus RAM, DR RAM). It should be noted that the memory in the systems and the methods described in this specification includes but is not limited to these memories and any memory of another proper type.

Figure 8:
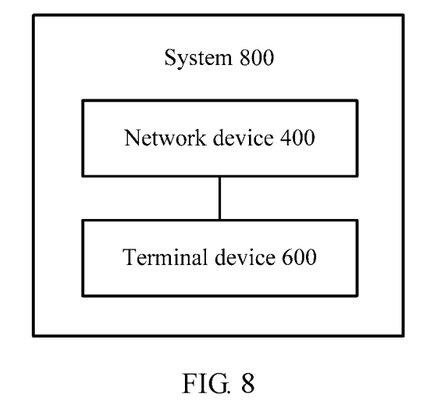
FIG. 8 is a schematic block diagram of a system according to an embodiment of this application.

An embodiment of this application further provides a system. As shown in FIG. 8, the system 800 includes:

the network device 400 in the foregoing embodiment of this application and the terminal device 600 in the foregoing embodiment of this application.

An embodiment of this application further provides a computer storage medium, and the computer storage medium may store a program instruction for performing any of the foregoing methods.

In some embodiments, the storage medium may be In some embodiments the memory 530 or the memory 730.

An embodiment of this application further provides a chip system. The chip system includes a processor, configured to support a distributed unit, a centralized unit, and a terminal device in implementing a function in the foregoing embodiment, for example, generating or processing data and/or information in the foregoing method. In a possible design, the chip system further includes a memory. The memory is configured to store a necessary program instruction and necessary data in the distributed unit, the centralized unit, and the terminal device. The chip system may include a chip, or may include a chip and another discrete device. It should be understood that data and/or information processed by the chip may be received from a base station, and processed data and/or processed information may also be sent to the base station.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
sending indication signaling, wherein the indication signaling indicates data transmission of one transport block, and the indication signaling carries a status value, wherein the indication signaling indicates a quantity of coding block groups in the transport block, the status value further indicates at least one coding block group in the data transmission, and the status value is represented by using a maximum of K+1 bits, K being a maximum value of the quantity of coding block groups that can be in the transport block; and
sending the at least one coding block group.

2. The method according to claim 1, wherein the status value is determined based on the quantity of coding block groups in the transport block and the at least one coding block group in the data transmission.

3. The method according to claim 1, wherein the status value, the quantity of coding block groups in the transport block, and a coding block group comprised in the data transmission meet the following relational expression:

$$X=Y+(2^M-a_M), \text{ wherein}$$

$0 \leq a_M \leq 2+M$, $1 \leq M \leq K$, $a_M$ is an integer, X represents decimal notation of the status value, Y represents decimal notation of a location index value, the location index value indicates a location of the at least one coding block group in the data transmission in the transport block, and M represents the quantity of coding block groups in the transport block.

4. The method according to claim 1, wherein the status value, the quantity of coding block groups in the transport block, and a coding block group in the data transmission meet the following relational expression:

$$X = Y + (2^M - a_M), \text{ wherein}$$

$0 \leq a_M \leq 2+M$, $a_M$ is a constant and is an integer, $1 \leq M \leq K$, X represents decimal notation of the status value, Y represents decimal notation of a location index value, the location index value is used to indicate a location of the at least one coding block group comprised in the data transmission in the transport block, and M represents the quantity of coding block groups comprised in the transport block.

5. The method according to claim 1, wherein the method further comprises:
receiving feedback information sent by a terminal device, wherein the feedback information indicates whether the terminal device receives at least one coding block group in the transport block, and the feedback information is determined by the terminal device based on the status value.

6. The method according to claim 5, wherein the feedback information comprises one bit, wherein the one bit indicates whether the terminal device correctly receives the at least one coding block group in the transport block.

7. A network device, comprising:
a sending module, configured to send indication signaling, wherein the indication signaling indicates data transmission of one transport block, and the indication signaling carries a status value, wherein the status value indicates a quantity of coding block groups in the transport block, the status value further indicates at least one coding block group in the data transmission, the status value is represented by using a maximum of N+1 bits, N being a maximum value of the quantity of coding block groups that can be in the transport block, wherein
the sending module is further configured to send the at least one coding block group.

8. The network device according to claim 7, wherein the status value is determined based on the quantity of coding block groups in the transport block and the at least one coding block group comprised in the data transmission.

9. The network device according to claim 7, wherein the status value, the quantity of coding block groups in the transport block, and a coding block group in the data transmission meet the following relational expression:

$$X = Y + (2^M - a_M), \text{ wherein}$$

$0 \leq a_M \leq 2+M$, $1 \leq M \leq N$, $a_M$ is an integer, X represents decimal notation of the status value, Y represents decimal notation of a location index value, the location index value indicates a location of the at least one coding block group in the data transmission in the transport block, and M represents the quantity of coding block groups in the transport block.

10. The network device according to claim 7, wherein the status value, the quantity of coding block groups in the transport block, and a coding block group in the data transmission meet the following relational expression:

$$X = Y + (2^M - a_M), \text{ wherein}$$

$0 \leq a_M \leq 2$, $1 \leq M \leq K$, $a_M$ is a constant and is an integer, X represents decimal notation of the status value, Y represents decimal notation of a location index value, the location index value indicates a location of the at least one coding block group in the data transmission in the transport block, and M represents the quantity of coding block groups comprised in the transport block.

11. The network device according to claim 7, wherein the network device further comprises:
a receiving module, configured to receive feedback information sent by a terminal device, wherein the feedback information indicates whether the terminal device correctly receives at least one coding block group in the transport block, and the feedback information is determined by the terminal device based on the status value.

12. The network device according to claim 11, wherein the feedback information comprises one bit, and the one bit indicates whether the terminal device correctly receives the at least one coding block group in the transport block.

13. A terminal device, comprising:
a receiving module, configured to receive indication signaling, wherein the indication signaling indicates data transmission of one transport block, and the indication signaling carries a status value, wherein the status value indicates a quantity of coding block groups in the transport block, the status value further indicates at least one coding block group in the data transmission, the status value is represented by using a maximum of N+1 bits, N being a maximum value of the quantity, indicated by the indication signaling, of coding block groups that can be in the transport block, wherein
the receiving module is further configured to receive the at least one coding block group.

14. The terminal device according to claim 13, wherein the terminal device further comprises:
a processing module, configured to determine, based on the status value, the quantity of coding block groups comprised in the transport block.

15. The terminal device according to claim 13, wherein the processing module is configured to:
determine $M = \max \{n | X \geq 2^n - a_M\}$ based on X, wherein $1 \leq M \leq N$, $a_M$ is an integer, X represents decimal notation of the status value, and M represents the quantity of coding block groups comprised in the transport block.

16. The terminal device according to claim 13, wherein the processing module is further configured to determine, based on the status value, at least one coding block group comprised in the transport block.

17. The terminal device according to claim 13, wherein the processing module is In some embodiments configured to:
determine $Y = X - (2^M - a_M)$ based on X and M, wherein $0 \leq a_M \leq 2+M$, $a_M$ is an integer, X represents the decimal notation of the status value, Y represents decimal notation of a location index value, the location index value is used to indicate a location of the at least one coding block group in the data transmission in the transport block, and M represents the quantity of coding block groups comprised in the transport block.

18. The terminal device according to claim 13, wherein the processing module is configured to:
determine $Y = X - (2^M - a_M)$ based on X and M, wherein $0 \leq a_M \leq 2+M$, $a_M$ is a constant and is an integer, X represents the decimal notation of the status value, Y represents decimal notation of a location index value, the location index value is used to indicate a location of the at least one coding block group comprised in the data transmission in the transport block, and M represents the quantity of coding block groups comprised in the transport block.

19. The terminal device according to claim 13, wherein the processing module is further configured to determine feedback information based on the location index value and the status value, wherein the feedback information indicates whether the terminal device receives the at least one coding block group in the transport block; and the terminal device further comprises:
a sending module, configured to send the feedback information to a network device.

20. The terminal device according to claim 19, wherein the feedback information comprises one bit, and the one bit indicates whether the terminal device receives the at least one coding block group in the transport block.

\* \* \* \* \*